United States Patent
Toka et al.

(10) Patent No.: US 10,271,225 B2
(45) Date of Patent: Apr. 23, 2019

(54) PERFORMANCE INDEX DETERMINATION FOR A COMMUNICATION SERVICE

(71) Applicant: Telefonaktiebolaget LM Ericsson (publ), Stockholm (SE)

(72) Inventors: László Toka, Budapest (HU); Péter Hága, Budapest (HU); Zsolt Kenesi, Budapest (HU); Péter Mátray, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/325,135

(22) PCT Filed: Aug. 20, 2014

(86) PCT No.: PCT/EP2014/067782
§ 371 (c)(1),
(2) Date: Jan. 10, 2017

(87) PCT Pub. No.: WO2016/026529
PCT Pub. Date: Feb. 25, 2016

(65) Prior Publication Data
US 2017/0181013 A1 Jun. 22, 2017

(51) Int. Cl.
*H04W 24/02* (2009.01)
*H04W 24/10* (2009.01)
(Continued)

(52) U.S. Cl.
CPC ......... *H04W 24/02* (2013.01); *H04L 41/0823* (2013.01); *H04L 41/5009* (2013.01);
(Continued)

(58) Field of Classification Search
CPC ..... H04W 24/02; H04W 24/08; H04W 24/04; H04W 16/00; H04W 36/18; H04W 24/10;
(Continued)

(56) References Cited

U.S. PATENT DOCUMENTS

| 8,145,186 B1 * | 3/2012 | Vaughan ............... H04W 24/08 455/405 |
| 9,220,018 B1 * | 12/2015 | Yang ..................... H04W 24/04 |
| 2004/0259555 A1 * | 12/2004 | Rappaport et al. .......... 455/446 |
| 2006/0217116 A1 | 9/2006 | Cassett et al. |

(Continued)

FOREIGN PATENT DOCUMENTS

EP   1715654 A1 * 10/2006   ............. H04L 29/08

OTHER PUBLICATIONS

Akyildiz, I. et al., "The Predictive User Mobility Profile Framework for Wireless Multimedia Networks", IEEE/ACM Transactions on Networking, Dec. 2004, pp. 1021-1035, vol. 12, No. 6.

*Primary Examiner* — Meless N Zewdu
(74) *Attorney, Agent, or Firm* — Coats & Bennett, PLLC

(57) ABSTRACT

The disclosure pertains to determining a performance index related to a performance of a communication service provided in a network, wherein the communication service is usable by a mobile user terminal. A method aspect is directed to determining the performance index by comparing performance information associated with a characteristic location of the user terminal and performance information associated with at least one other location visited by the user terminal, the performance index being indicative of a relative performance of the communication service at the characteristic location of the user terminal compared to the at least one other location visited by the user terminal.

22 Claims, 4 Drawing Sheets

(51) Int. Cl.
*H04L 12/24* (2006.01)
*H04L 12/26* (2006.01)
*H04W 24/04* (2009.01)
*H04W 24/08* (2009.01)

(52) U.S. Cl.
CPC ...... *H04L 43/0817* (2013.01); *H04L 43/0823* (2013.01); *H04W 24/04* (2013.01); *H04W 24/08* (2013.01); *H04W 24/10* (2013.01)

(58) Field of Classification Search
CPC ......... H04W 24/06; H04W 4/00; H04W 4/02; H04W 4/021; H04L 41/0823; H04L 43/0817; H04L 43/0823; H04L 41/5009; H04L 12/26; H04L 12/24; H04L 41/0836; H04L 41/0817; G06F 11/3447; G06F 11/3452; G06F 11/3409; G06F 11/3466; G06F 11/3457
See application file for complete search history.

(56) References Cited

U.S. PATENT DOCUMENTS

| | | | |
|---|---|---|---|
| 2009/0310501 A1 | 12/2009 | Catovic et al. | |
| 2011/0191465 A1* | 8/2011 | Hofstaedter | G06F 15/173 709/224 |
| 2012/0110012 A1 | 5/2012 | Borsos et al. | |
| 2014/0141788 A1* | 5/2014 | Puthenpura | H04W 16/18 455/449 |
| 2014/0280884 A1* | 9/2014 | Searle | H04L 43/0864 709/224 |
| 2015/0098352 A1* | 4/2015 | Froehlich | H04W 24/08 370/252 |

\* cited by examiner

| Subscriber X | Cell identifier #1 | Cell identifier #2 | ... | Cell identifier #K |
|---|---|---|---|---|
| Timestamp #1 | KSA #1 : value, KSA #2 : value, ... KSA #M : value | | | |
| Timestamp #2 | | | | |
| ... | | | | |
| Timestamp #T | | | | |

Fig. 3

PERFORMANCE INDEX DETERMINATION FOR A COMMUNICATION SERVICE

TECHNICAL FIELD

The present disclosure generally relates to performance index determination. In particular, a technique for determining a performance index related to a performance of a communication service provided in a network, the communication service being usable by a mobile user terminal, is presented. The technique may be practiced in the form of a method, a computer program, a computer readable storage medium and an apparatus.

BACKGROUND

Currently, network operators perform traditional network optimization. The goal thereof is to provide the highest possible service quality with the operator's available resources. In some cases, if subscribers complain about a low level of service quality, network optimization systems are capable of providing actions in a reactive manner.

Proactive optimization on a subscriber level is, however, generally not a capability of these traditional approaches. Among the reasons for this is a lack of analysis tools for service quality data on a subscriber level—if such data is at all acquired and long-term storage thereof is provided so as to have a sufficient data pool for long-term service quality analysis. In some cases, even though network operators acquire service quality data, they do not exploit them for network optimization but rather sell them to third parties that use the data for other purposes (e.g., marketing purposes).

Moreover, network operators do not know the actual service quality level demands of their subscribers. This is, however, essential for being able to meet those demands. As another issue, only low level network parameters are tuned in current network optimization processes. It is often unsure if this low level parameter tuning is efficient as regards a subscriber's perception of service quality.

In sum, for high customer satisfaction, it is crucial to achieve a good user experience. Current network optimization approaches do not guarantee that the actual subscriber experience attained is good compared to the subscriber experience possible with the available network resources.

SUMMARY

There is a need for a technique that enables obtaining data that may be used in network optimization yielding a service quality improvement that directly benefits network subscribers.

According to a first aspect, a method of determining a performance index related to a performance of a communication service provided in a network is presented, wherein the communication service is usable by a mobile user terminal. The method comprises determining the performance index by comparing performance information associated with a characteristic location of the user terminal and performance information associated with at least one other location visited by the user terminal, the performance index being indicative of a relative performance of the communication service at the characteristic location of the user terminal compared to the at least one other location visited by the user terminal.

According to a second aspect, a computer program comprising computer program code is provided, the computer program code when executed by a processor causing an apparatus to perform the actions of the method. According to a third aspect, a computer readable storage medium in which such computer program code is stored is disclosed. The computer readable storage medium may, for instance, comprise a semiconductor memory, a hard disk, a CD-ROM or a DVD. The computer program product may also be provided for download, e.g., via a network connection.

Moreover, according to a fourth aspect, an apparatus for determining a performance index related to a performance of a communication service provided in a network, the communication service being usable by a mobile user terminal, is disclosed. The apparatus comprises at least one processor and at least one memory including computer program code. Therein, the computer program code is configured to control the at least one processor to determine the performance index by comparing performance information associated with a characteristic location of the user terminal and performance information associated with at least one other location visited by the user terminal, the performance index being indicative of a relative performance of the communication service at the characteristic location of the user terminal compared to the at least one other location visited by the user terminal. The apparatus may be configured to perform the method and method steps presented herein.

In the following description, for reasons of conciseness focus is sometimes put on the method according to the first aspect. The given explanations, however, correspondingly apply to the second, third and fourth aspects.

As an example, the communication service may be a voice communication service or a data communication service. The network in which the communication service is provided may, for instance, be a wireless network, e.g., a network according to the Universal Mobile Telecommunications System (UMTS) standard, a Long-Term Evolution (LTE) network, or a wireless local area network (WLAN) to name but a few examples. The network may or may not be a cellular network. The user terminal may by any mobile user terminal capable of using a communication service, e.g., a cellular phone, for instance a smartphone, a mobile computing device, e.g., a notebook or tablet computer, or a portable gaming device.

The performance index may be indicative of a performance of the communication service as perceived by a user of the user terminal at the characteristic location. Thus, the performance index—for instance in contrast to information on low level network parameters—may reflect a user's service performance experience particularly well, thereby allowing network resource allocation, provision and/or configuration in a way yielding a direct improvement of user experience based on the performance index.

The performance information may comprise information on at least one service attribute of the communication service. The performance index may be related to the service attribute. To name but a few examples, the at least one service attribute may be indicative of one or more of a network/data throughput, e.g., an Internet download throughput, for instance on a Transport Control Protocol (TCP) level, a network load or cell load, a network coverage (and thus service coverage), a network latency, a backhaul capacity, a radio signal strength, a received signal code power (RSCP), a radio interference, a delay and a number of video freezes. The actual values of these service attributes are typically relevant for a user's perception of a performance of the communication service. For instance based on performance information comprising information on one or more of these service attributes, a performance index related to such a service attribute(s) and thus indicative of a performance of the communication service as perceived by a user of the user terminal may be determined.

At least one timestamp may be associated with the performance information. The timestamp may for instance indicate a performance information acquisition time, e.g., a performance information measurement time or the like. The timestamp may be taken into account in performance index determination.

The characteristic location may be a location determined by at least one of: a longer time interval spent by the user terminal at the characteristic location than at the at least one other location, a higher visiting rate at the characteristic location than at the at least one other location, and a more intensive usage of the communication service at the characteristic location than at the at least one other location. In each of the above cases, the characteristic location may be considered as a location of particular relevance for the user terminal. For instance, a location where a longer time interval is spent by the user terminal than at another location may be a place of work, e.g., office or production plant, or home of a user of the user terminal. A user's work or home location may also be examples of locations having a higher visiting rate by the user terminal than other locations and/or may be characterized by a particularly intensive usage of the communication service.

The characteristic location may be determined. For instance, the characteristic location may be determined based on location information indicative of locations of the user terminal within the network. The performance information may be associated with the location information.

The network may be a cellular network and the location information may comprise at least one of a cell identifier and an identifier of a group of cells. To give but one other example of location information, the location information may also comprise geographic information such as geographic coordinates or the like.

Determining the characteristic location may also be based on at least one of residence information associated with the location information, the residence information being indicative of a time interval spent at a location indicated by the location information; visiting information associated with the location information, the visiting information being indicative of a visiting pattern of the location indicated by the location information; and service usage information associated with the location information, the service usage information being indicative of a service usage at the location indicated by the location information. Thus, a profound basis for characteristic location determination is provided. Moreover, the residence information, the visiting information and the service usage information may allow for determining a characteristic location characterized by, in comparison the at least one other location, a longer time interval regularly spent there by the user terminal, a higher visiting rate, and a more intensive usage of the communication service, respectively.

Performance information may be obtained at equally spaced points in time with a constant time interval therebetween; the performance information may comprise performance data for several of the points in time, the performance data being associated with a common location indicated by the location information; and the residence information may be obtained based on the performance data and the location information. Due to the constant time interval between points in time at which the performance information is obtained, e.g. measured, and due to the performance data being associated with the common location indicated by the location information, the number of performance data sets may be deemed an indicator for the time spent by the user terminal at the common location. Multiplying the number of performance data sets by a duration of the time interval may yield a duration of the user terminal's residence at the common location.

Determining the characteristic location may comprise calculating a characteristic location indicator based on at least one of a value derived from the residence information, a value derived from the visiting information and a value derived from the service usage information. Evaluation of the characteristic location indicator for a specific location indicated by the location information may then yield whether or not said specific location is to be considered as a characteristic location or not. Calculating the characteristic location indicator may comprise calculating a weighted combination of at least two of a value derived from the residence information, a value derived from the visiting information, and a value derived from the service usage information. Therein, any of the value derived from the residence information, the value derived from the visiting information and the value derived from the service usage information considered in calculating the characteristic location indicator may relate to the same location. Specifically, they may relate to the same location indicated by location information associated with the residence information, visiting information and/or service usage information from which the considered values are derived.

Determining the characteristic location may comprise comparing the characteristic location indicator to a threshold. A location indicated by the location information may in this regard qualify as a characteristic location if the characteristic location indicator is greater than the threshold. A first characteristic location indicator may be calculated for a first time scale and a second characteristic location indicator may be calculated for a second time scale. By calculating different characteristic location indicators for different time scales (i.e., different temporal granularities or time windows) in deciding whether or not a location is a characteristic location, different pools of information are taken into account. Thereby, more precise characteristic location determination may be rendered possible.

So as to determine different characteristic location indicators for different time scales, the data considered in calculating characteristic location indicators may be varied. For instance, if characteristic location indicator calculation is based on at least one of a value derived from the residence information, a value derived from the visiting information and a value derived from the service usage information, the respective value(s) may be calculated from residence information/visiting information/service usage information for that respective time scale. To give but a few examples, the first time scale may be an hourly, daily, weekly, monthly or yearly time scale and the second time scale may be another one of the above time scales.

Determining the characteristic location may comprise comparing the first characteristic location indicator to a first threshold and comparing the second characteristic location indicator to a second threshold. A location indicated by the location information may qualify as a characteristic location if the first characteristic location indicator is greater than the first threshold and the second characteristic location indicator is greater than the second threshold. Thus, to qualify as a characteristic location, both the first and the second characteristic location indicator have to have sufficiently large values. Put differently, a location has to qualify as a characteristic location on both time scales to be accepted as a characteristic location. In a more general context, if more than two time scales are considered, i.e., if more than two characteristic location indicators are calculated, each of the calculated characteristic location indicators may be compared to a respective threshold. In this case, the location indicated by the location information may be accepted as a characteristic location if it qualifies as a characteristic location on a majority of the considered time scales.

A value may be assigned to the performance index based on a first performance value derived from the performance information associated with the characteristic location and a second performance value derived from the performance information associated with the at least one other location. The first performance value may for instance be derived from at least one value of a service attribute of the communication service, the values of the service attribute forming part of the performance information associated with the characteristic location. The second performance value may for instance be derived from at least one value of the service attribute of the communication service, the values of the service attribute forming part of the performance information associated with the at least one other location.

At least one of the first performance value may be derived by averaging values of a service attribute of the communication service for different points in time, the values of the service attribute forming part of the performance information associated with the characteristic location; and the second performance value may be derived by averaging values of a service attribute of the communication service for different points in time, the values of the service attribute forming part of the performance information associated with the at least one other location. The performance index for the characteristic location is then based on a comparison of averaged service attribute values for the characteristic location and the at least one other location. Considering time-averaged service attribute values may yield a more precise performance index determination than, for instance, considering only a single point in time and thus a single service attribute value for the characteristic location and the at least one other location. Time-average service attribute values are more likely to correctly represent the overall service performance experienced at the characteristic location and the at least one other location, respectively.

The value assigned to the performance index may be a first value if the first performance value is below a difference calculated by subtracting a threshold from the second performance value; a second value if the first performance value is greater than or equal to the difference calculated by subtracting the threshold from the second performance value and smaller than a sum of the second performance value and the threshold; a third value if the first performance value is greater than the sum of the second performance value and the threshold. Thus, performance index value assignment is performed based on the difference of the first performance value and the second performance value relative to the threshold. As the performance index may in this case only assume three different values, further processing of the performance index is facilitated. Alternatively, a difference between the first performance value and the second performance value may be assigned to the performance index. In this case, the performance index provides quantitative information on the performance at the characteristic location compared to the at least one other location.

The performance information associated with the characteristic location is compared with expected performance information. The performance information associated with the at least one other location may be considered as expected performance information because it indicates the performance that may be expected based on the communication service performance experienced at/across the other location(s) visited by the user terminal. Thus, it may be determined if the performance at the characteristic location is as expected (e.g., if it meets the expectations of a user of the user terminal in case of the performance information being indicative of a performance of the communication service expected by a user of the user terminal). Apart from the performance information associated with the at least one other location, other expected performance information may also be provided. For instance, the expected performance information may indicate a relatively good service performance experienced by the user terminal or the user thereof (e.g., the best service performance ever experienced). The relatively good service performance experienced may for instance relate to a service attribute of the communication service. The relatively good service performance experienced may for instance be expressed in terms of a value of a service attribute of the communication service, e.g. the best value of that service attribute ever experienced by the user terminal independent of the location of this experience.

The performance information associated with the characteristic location may comprise current performance information and the expected performance information may be based on past performance information. Based on a comparison of the current performance information and the expected performance information, it may then be determined if current performance at the characteristic location meets the performance that may be expected in view of a past service performance.

A network optimization proposal may be generated based on the performance index. Thus, using the information provided by the performance index, a proposal for a targeted network optimization aiming at improving service performance at the characteristic location may be obtained.

A plurality of characteristic locations may be determined for a plurality of user terminals. Therein, for each of the plurality of characteristic locations and for each user terminal having that respective characteristic location, performance indexes related to the same service attribute of the communication service may be determined. Thus, a multitude of performance indexes for a multitude of user terminals and for a multitude of respective characteristic locations are obtained. For example, this information may be exploited for determining a characteristic location among the multitude of characteristic locations at which a significant number of performance indexes among the multitude of performance indexes is low, thus indicating a lack of performance of the communication service at that location. Measurements for improving performance at that location may then be taken.

BRIEF DESCRIPTION OF THE DRAWINGS

Further aspects, details and advantages of the present disclosure will become apparent from the following description of exemplary embodiments and the drawings, wherein:

FIG. 3 schematically illustrates an embodiment of a subscriber terminal profile database table stored in a subscriber profile database of the system of FIG. 1;

DETAILED DESCRIPTION

In the following description of exemplary embodiments, for purposes of explanation and not limitation, specific details are set forth in order to provide a thorough understanding of the technique presented herein. It will be apparent to one skilled in the art that the technique presented herein may be practiced in other embodiments that depart from these specific details. For example, while the following embodiments will exemplarily be described in connection with an example system architecture and in the context of an example network environment, it will be understood that embodiments may also be implemented in other network environments and other system or apparatus contexts.

Moreover, those skilled in the art will appreciate that certain methods, functions and procedures presented herein may be implemented using software in conjunction with a programmed microprocessor, digital signal processor or general purpose computer. For example, the present disclosure may be embodied in a computer program product which can be loaded on a computer system that comprises one or more processors and one or more memories, wherein the one or more memories are configured to store one or more programs that perform certain methods, functions and procedures disclosed herein when run on the one or more processors of the computer system.

Figure 1:
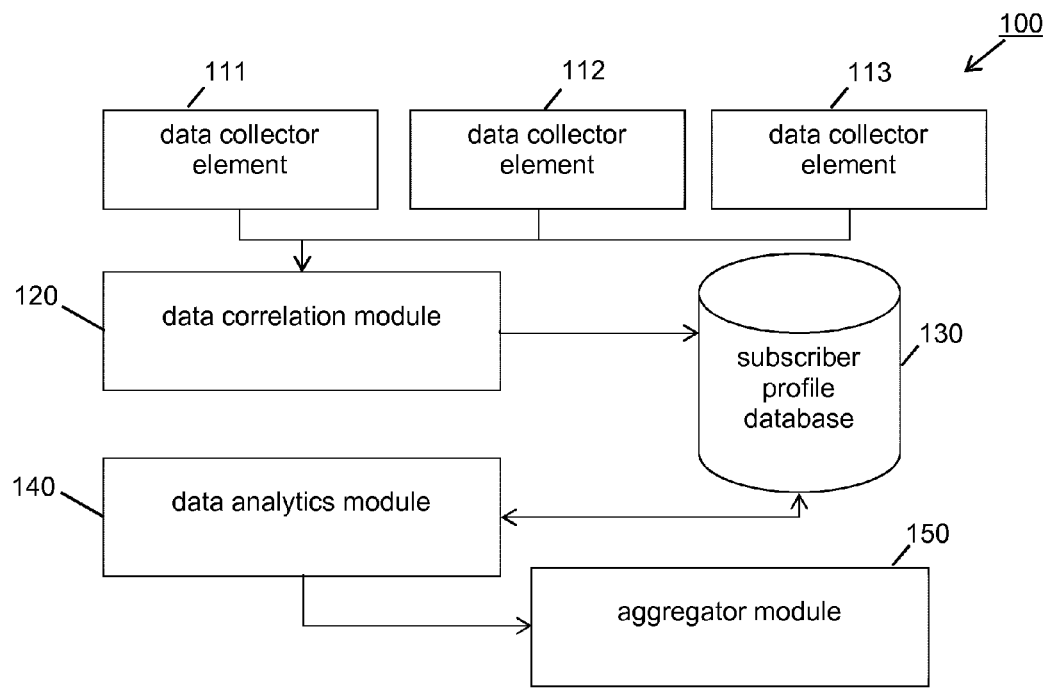
FIG. 1 schematically illustrates an architecture of a system in which embodiments of the present disclosure may be implemented.

FIG. 1 schematically illustrates an architecture of a system 100 in which embodiments of the present disclosure may be implemented. The system 100 includes plurality of data collector elements 111, 112, 113. Further, a data correlation module 120, a subscriber profile database 130, a data analytics module 140 and an aggregator module 150 are provided.

Figure 2:
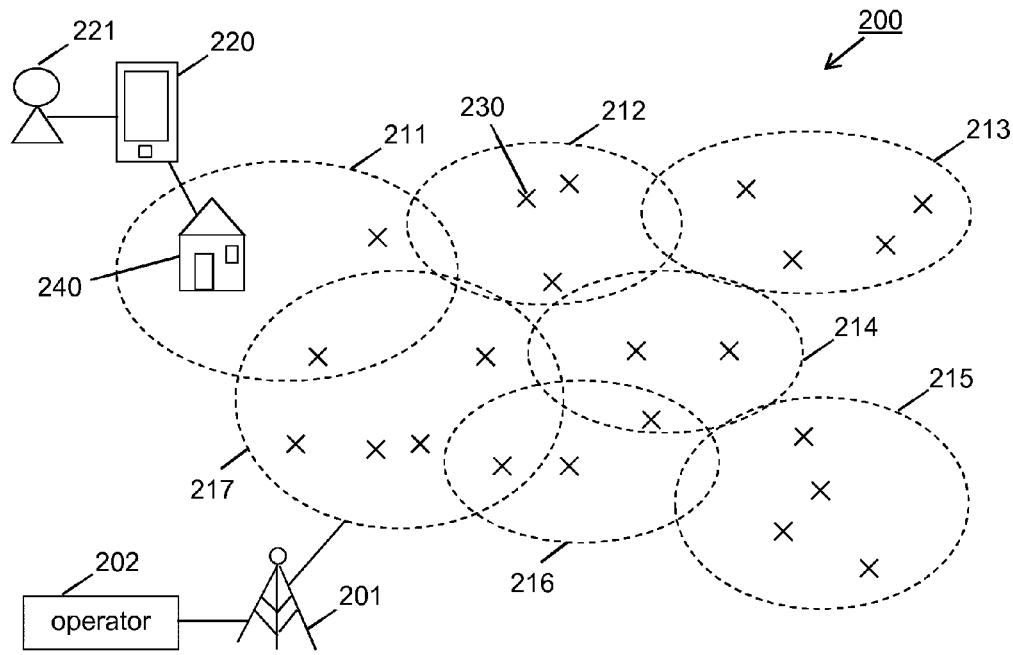
FIG. 2 schematically illustrates an environment in which embodiments of the present disclosure may be employed.

FIG. 2 schematically illustrates an environment 200 in which embodiments of the present disclosure may be employed. System 100 will be explained in the context of the environment 200.

In FIG. 2, a communications network 201, represented by an antenna, is shown. The network 201 provides a plurality of communication services, including voice communication services such as telephone services, and data communication services (e.g., e-mail services and Internet services). In the context of the presently described example, network 201 may for instance have an access network portion according to the UMTS standard or an LTE network. Network 201 is operated by a network operator or provider 202. As network 201 is a cellular network, network 201 comprises a plurality of cells represented in FIG. 2 by cells 211-217.

The communication services provided in network 201 are usable by mobile user terminals such as smartphone 220. In the illustrated example, smartphone 220 belongs to a user 221 who usually carries smartphone 221 with him or her. Smartphone 220 and user (also called "subscriber" hereinafter) 221 have subscribed to services provided by network 201 and network operator 202. For the sake of simplicity, mobile user terminals belonging to other subscribers of network 201 are not depicted in FIG. 2. It will be appreciated that user, or subscriber, 221 may have multiple mobile user terminals such as smartphone 220 that are all associated with a single subscription. As such, the technique presented herein also encompasses the case in which the performance index is determined for multiple user terminals bound to a single subscription.

In FIG. 2, examples of locations 230 visited by smartphone 220 are indicated by crosses. A further location, i.e., a home of user 221, is denoted by reference numeral 240.

Returning to FIG. 1, data collector elements 111-113 represent probes and network logging elements that are configured to record traffic, service and network meta-information in network 201. Acquiring these data may for instance comprise performing deep packet inspection. The recorded data inter alia comprise location information indicating user terminal locations within network 201 and performance information. The performance information in turn comprises information on service attributes of a communication service provided in network 201. Timestamps are associated with the performance information. The data collected by data collector elements 111-113 constitute the basis for subsequent characteristic location determination and performance index determination. Data collector elements 111-113 are configured to provide the collected data to data correlation module 120.

Data correlation module 120 is configured to receive the data provided by data collector elements 111-113. Data correlation module 120 is further configured to correlate various pieces of information comprised by the provided data. In the presently discussed example, the correlated data is aggregated by subscriber terminal, time and location. Data correlation module 120 is configured to provide the correlated data to subscriber profile database 130.

Subscriber profile database 130 is configured to receive the correlated data provided by data correlation module 120 and to store the data for a predefined period of time, thus making long-term communication service performance analysis possible. For at least one subscriber terminal within network 201, in the present case for each subscriber terminal within network 201, a subscriber terminal profile database table is provided in subscriber profile database 130.

FIG. 3 schematically illustrates such a subscriber terminal profile database table 300 for smartphone 220. Therein, subscriber terminal 220 is identified based on an associated Mobile Subscriber Integrated Services Digital Network-Number (MSISDN) and/or an associated International Mobile Subscriber Identity (IMSI) 301. Table 300 further contains the mobile network cell identifiers 310-1, 310-2, . . . , 310-K of the plurality of cells comprising cells 211-217 and timestamps 320-1, 320-2, . . . , 320-T indicative of the start of consecutive time periods of service attribute measurement. For each location and timestamp combination in which subscriber terminal 220 has communication service activity, values of key service attributes (KSA) 331 of a communication service provided in network 201 are stored. When a subscriber has no activity, even though residing at that location, no KSA values are obtained or stored. Thus, only when a communication service is actually used at a location, KSA values for the respective location and the respective timestamp are taken into account in performance index determination.

Values for the KSAs 331 are periodically collected by data collector elements 111-113 at equally spaced points in time with a constant time interval therebetween, correlated in data correlation module 120 and stored in subscriber profile database 130. The KSAs considered are selected based on their relevance as to a user's perception of the performance of the communication service. The KSAs may for instance comprise a network/data throughput, e.g., an Internet download throughput, for instance on a Transport Control Protocol (TCP) level, a network load or cell load, a network coverage (and thus service coverage), a network latency, a backhaul capacity, a radio signal strength, an RSCP, a radio interference, a delay, and a number of video freezes. For instance, a RSCP is a reliable radio coverage indicator. Thus, a RSCP is an important service attribute of a radio communication service. It is indicative of a service performance as perceived by a user. For an internet access communication service, a download throughput of the user terminal's Internet traffic is an important service attribute indicative of a perceived Internet access service performance.

Each time smartphone 220 visits a cell, e.g., a cell having cell identifier 310-1 associated therewith, values of the KSAs are stored in table 300 in a field corresponding to a current timestamp and corresponding to the cell identifier. Consequently, for a repeatedly visited specific location indicated by a cell identifier 310-1, 310-2, . . . , 310-K, table 300 comprises performance data, i.e., KSA value sets, for several of the points in time indicated by the timestamps 320-1, 320-2, . . . , 320-T.

If the time granularity at which data collector elements 111-113 periodically collect KSA values is chosen sufficiently fine, e.g. chosen to be minutely, the KSA values may be considered to represent KSA values for the communication service at the locations, i.e., cells, having the cell identifiers for which they are filled into table 300. It is moreover noted that in the context of the presently described embodiment, both actual user terminal locations, such as locations 230 and 240, and the spatially more coarsely dissolved information on the cell in which a location is located are considered possible expressions of user terminal locations Not shown in table 300 of FIG. 3 is that subscriber profile database 130 is configured to also store—for at least one of the KSAs up to each of the KSAs—the best value ever experienced by the respective subscriber terminal, no matter where that value has been experienced. Overall, subscriber profile database 130 is configured to store long-term statistics about user terminal locations and encountered service performance.

Returning to FIG. 1, data analytics module 140 is configured to access subscriber profile database 130. Further, data analytics module 140 is configured to determine characteristic locations for user terminals within network 201 (including smartphone 220) and to determine a performance indexes related to a communication service provided in network 201 based on the performance information stored in subscriber profile database 130. To this end, it is configured to compare performance information associated with the characteristic location of a respective mobile user terminal and performance information associated with at least one other location visited by the user terminal. Specifically, a comparison of the values 331 of KSAs stored for a cell identifier associated with a characteristic location and the values stored for at least one cell identifier associated with another location is performed.

Data analytics module 140 is configured to periodically scan the subscriber profile database 130 and check if a characteristic location has been determined for a given subscriber terminal. If no characteristic location has been so far been determined, data analytics module 140 tries to determine such a characteristic location. In the following, an example of determining a characteristic location of smartphone 220 based on the information stored in data subscriber terminal profile database table 300 depicted in FIG. 3 will be explained.

According to this example, characteristic location determination is inter alia based on residence information associated with the location information, i.e. with cell identifiers 310-1, 310-2, . . . , 310-K stored in table 300, and associated timestamps 320-1, 320-2, . . . , 320-T. Due to the constant time interval between points in time at which KSA values are collected by data collector elements 111-113, the number of KSA value sets associated with the same cell, i.e. the number of sets of KSA values stored in table 300 for a specific cell identifier but for different timestamps 320-1, 320-2, . . . , 320-T, may be deemed an indicator for the time spent by smartphone 220 at that specific cell. Table 300 therefore comprises residence information indicating a time interval spent by smartphone 220 within a specific cell of the plurality of cells including cells 211-217. Data analytics module 140 is configured to derive values from the residence information (residence values) by multiplying the number of performance data sets stored in table 300 per cell identifier by a duration of the time interval between the points in time at which data collector elements 111-113 collect values for the KSAs. The derived residence values thus express per cell estimates of the total time of the smartphone's 220 residence within each of the cells corresponding to the cell identifiers 310-1, 310-2, . . . , 310-K.

According to the present example, characteristic location determination is further based on visiting information associated with cell identifiers 310-1, 310-2, . . . , 310-K and associated with timestamps 320-1, 320-2, . . . , 320-T. The difference of timestamps among timestamps 320-1, 320-2, . . . , 320-T for which a number of subsequent rows of table 300 all contain KSA values 331 for a certain cell identifier, i.e. for which performance data are provided due to an activity of smartphone 220 in the respective cell, indicates the regularity of the smartphone's 220 appearances in the respective cell. Table 300 therefore comprises visiting information indicating a visiting pattern of a specific cell of the plurality of cells including cells 211-217. Data analytics module 140 is configured to derive values from the visiting information (visiting values) by calculating that difference for each cell identifier 310-1, 310-2, . . . , 310-K.

According to the present example, characteristic location determination is moreover based on service usage information associated with cell identifiers 310-1, 310-2, . . . , 310-K and associated with timestamps 320-1, 320-2, . . . , 320-T. For instance, the KSA values 331 stored in table 300 for a specific cell identifier may comprise information on voice and/or data communication activity within the corresponding cell. In combination with the associated timestamps, the voice and/or data communication activity information may be deemed an indicator for the duration of voice and/or data communication activity of smartphone 220 within the respective cell. Table 300 therefore comprises service usage information indicating service usage at a specific cell of the plurality of cells 211-217. Data analytics module 140 is configured to derive values from the service usage information (service usage values) by calculating a voice and/or data communication activity duration, e.g., in minutes, for each cell identifier based on the service usage information stored in table 300.

In the following, an example of a specific implementation of characteristic location determination is given. Let t be a residence value, i.e., in the present example the time spent a within a specific cell (e.g., in minutes). Further, let n be a visiting value, i.e. in the present case the number of visits of a user terminal at a specific cell. Moreover, let u denote a service usage value, i.e. in the present example the time of voice and/or data communication activity within a specific cell, e.g. in minutes. Each of the above values is determined for different time scales/time windows, hereinafter denoted TS, in the present example for daily, weekly and monthly granularities. To this end, only timestamps and associated KSA values of the respective time scale TS are considered.

Let $L=\{1, 2, 3, \ldots, l\}$ be the locations available within network 201 of operator 202 according to the employed location granularity, which is cell granularity in the present case. In another example, a more coarse location granularity, e.g. group of cells granularity could be chosen. Let $t_L$, $n_L$, $u_L$ denote the spatial distribution, i.e. location distribution, of the above values for a given time scale TS, and a given subscriber terminal so that $\Sigma_1^l t_L = \Sigma_1^l n_L = \Sigma_1^l u_L = 1$ applies. By combining these three values for each location, a characteristic location indicator, hereinafter denoted $A_L$, is calculated for each time scale TS. Characteristic location indicator $A_L$ represents a spatio-temporal activity distribution for each time scale TS and each subscriber terminal.

Calculation of $A_L$ is based on a weighted combination of the residence value, the visiting value and the service usage value:

$$A_L = \alpha \times t_L + \beta \times n_L + \gamma \times u_L.$$

Therein, $\alpha$, $\beta$, $\gamma$ are weights and $\alpha+\beta+\gamma=1$ applies. The exact values of the weights are chosen dependent on the specific use case.

Data analytics module 140 is configured to select the location(s) L as the characteristic location(s) $L_{char}$ of a subscriber terminal, for which $A_L > \delta_{TS}$ on a majority of the considered time scales TS. Therein $\delta_{TS}$ is a time scale dependent threshold. In the present example, a location L is thus accepted as a characteristic location if it qualifies as a characteristic location on at least two time scales. In the present example, it is determined that cell 211 is a characteristic location $L_{char}$ of smartphone 220. This is due to cell 211 covering location 240. Location 240 is the home of user 221 to whom smartphone 220 belongs. Compared to the other locations 230 and thus to cells 212-217, user 221—and thus smartphone 220—visit the user's home very often and regularly spend long time intervals there. Moreover, a communication service provided in network 201 is used intensively from location 240.

In the following, an example of determining a performance index for a characteristic location of smartphone 220 will be explained. The performance index is related to one of the KSAs 331 for which values are stored in table 300 shown in FIG. 3. Let $KSA_{char}$ denote a KSA value for a characteristic location $L_{char}$ of smartphone 220, i.e. in the present example cell 211 comprising home location 240 of user 221. Data analytics module 140 is configured to average values of the respective KSA associated with different timestamps 320-1, 320-2, ..., 320-T and associated with the determined characteristic location $L_{char}$, i.e., associated with the corresponding cell identifier, e.g. cell identifier 310-1. By this averaging step, $KSA_{char}$ is obtained. Data analytics module 140 is moreover configured to average values of the respective KSA associated with different timestamps 320-1, 320-2, ..., 320-T and associated with each of the other network locations $L_{other}$ 230 visited by smartphone 220 but not considered characteristic locations according to the previous characteristic location determination step. Thus, with $KSA_{char}$ and $KSA_{other}$, two performance values are determined. Therein, $KSA_{char}$ is obtained from performance information associated with $L_{char}$ and $KSA_{other}$ is obtained from performance information associated with $L_{other}$. $KSA_{other}$ may be considered an indicator for an expected performance of a communication service within network 201 for smartphone 220 as regards the respective KSA. This is due to $KSA_{other}$ indicating the performance that may be expected based on the communication service performance experienced across the other locations 230 visited by smartphone 220.

Data analytics module 140 is configured to compare $KSA_{char}$ and $KSA_{other}$ and to assign a value to the performance index $S^{KSA}$ related to the respective KSA based on the comparison result. Specifically, with $\in$ being an adjustable threshold, the following value assignment is performed:

$S^{KSA} = -1$ if $KSA_{char} < KSA_{other} - \in$ $S^{KSA} = 0$ if $KSA_{other} - \in \leq KSA_{char} < KSA_{rest} + \in$ $S^{KSA} = 1$ if $KSA_{other} + \in < KSA_{char}$.

According to the presently discussed embodiment, $S^{KSA}$ thus only assumes three different values. Hence, performance index $S^{KSA}$ gives an indication of the relative performance of the communication service at the characteristic location $L_{char}$ compared to the other locations $L_{other}$ that facilitates further processing thereof. According to another embodiment, the difference between $KSA_{char}$ and $KSA_{other}$ is assigned to the performance index (i.e., $S^{KSA} = KSA_{char} - KSA_{other}$). In this case, the performance index $S^{KSA}$ provides quantitative information on the performance at the characteristic location $L_{char}$ compared to the other locations $L_{other}$. Data analytics module 140 is configured to store determined characteristic locations and determined performance indexes for each subscriber terminal within network 201 in subscriber profile database 130.

In the context of both embodiments, performance index $S^{KSA}$ may be directly exploited as a basis for generating a network optimization proposal aiming at improving service performance at the characteristic location $L_{char}$ at least with respect to the KSA to which performance index $S^{KSA}$ relates. However, in another example explained below, further processing steps are first performed before a network optimization proposal is generated. In an embodiment, it is refrained from generating a network optimization proposal if the value $KSA_{char}$ for a respective KSA at the characteristic location $L_{char}$ does not indicate a significantly lower performance than the best value ever experienced by the respective subscriber terminal for that KSA stored in subscriber profile database 130 (e.g., the absolute value of their difference exceeding a threshold).

Returning to FIG. 1, aggregator module 150 is configured to communicate with data analytics module 140. Once performance indexes $S^{KSA}$ have been determined for each subscriber terminal of network 201 and for every characteristic location thereof, aggregator module 150 aggregates them by location. If different KSAs are considered and corresponding performance indexes are calculated, aggregator module 150 also aggregates them by KSA. Subsequently, given the all the performance indexes $S^{KSA}$ for a specific KSA for the subscriber terminals i and location L, a location service level index (LSLI) for that KSA at that location L, is calculated by aggregator module 150 as $LSLI_L^{KSA} = \Sigma_i S_i^L$. Aggregator module 150 is further configured to, for each KSA, create a list of the calculated LSLIs for each of the locations L. Therein, the LSLIs are sorted in descending order. The LSLI at the bottom of the list then indicates that at the associated location L performance of the communication service with respect to the considered KSA is low. Thus among the multitude of characteristic locations considered, a location having a particularly low communication service performance with respect to the KSA is determined. Based on the above LSLI calculation and sorting, the aggregator module 150 can thus identify locations where insufficient service performance/quality significantly depresses user experience. The KSA to which the LSLI and the service performance indexes on which the LSLI is based relate reveals the nature of the service performance problem.

Actions for improving performance at that location may then be taken. To support improving performance at the identified location, aggregator module 150 is configured to generate a network optimization proposal based on the LSLI for that location and that KSA and thus based on the service performance indexes used for calculating that LSLI. For instance, the network optimization proposal may suggest installing further network access equipment, e.g., provision of a pico-cell or a femto-cell, to improve performance at the problematic location. In generating the network optimization proposal, apart from information on a location where service performance should be improved and apart from information on the service attribute for which low performance is indicated, other information may be taken into account. For instance, communication service usage information of at least one user terminal having that location as a characteristic location may be considered. To give but one example, a traffic attribute associated with the user terminal may be used. For instance, if the user terminal usually downloads large data volumes when located at that location, installing a fixed line access might be a better suited solution than providing a pico-cell or a femto-cell.

As an alternative or additional step to network optimization, the affected subscribers, e.g., user 221, can be addressed individually by a proactive customer care service or by a marketing campaign to retain the subscriber as a client of operator 202 until the service performance problem has been resolved. Likewise, it may be offered to the subscriber to initiate service performance problem mitigation himself, e.g., by ordering a fixed line communication access or pico-cell installation from operator 202.

Figure 4:
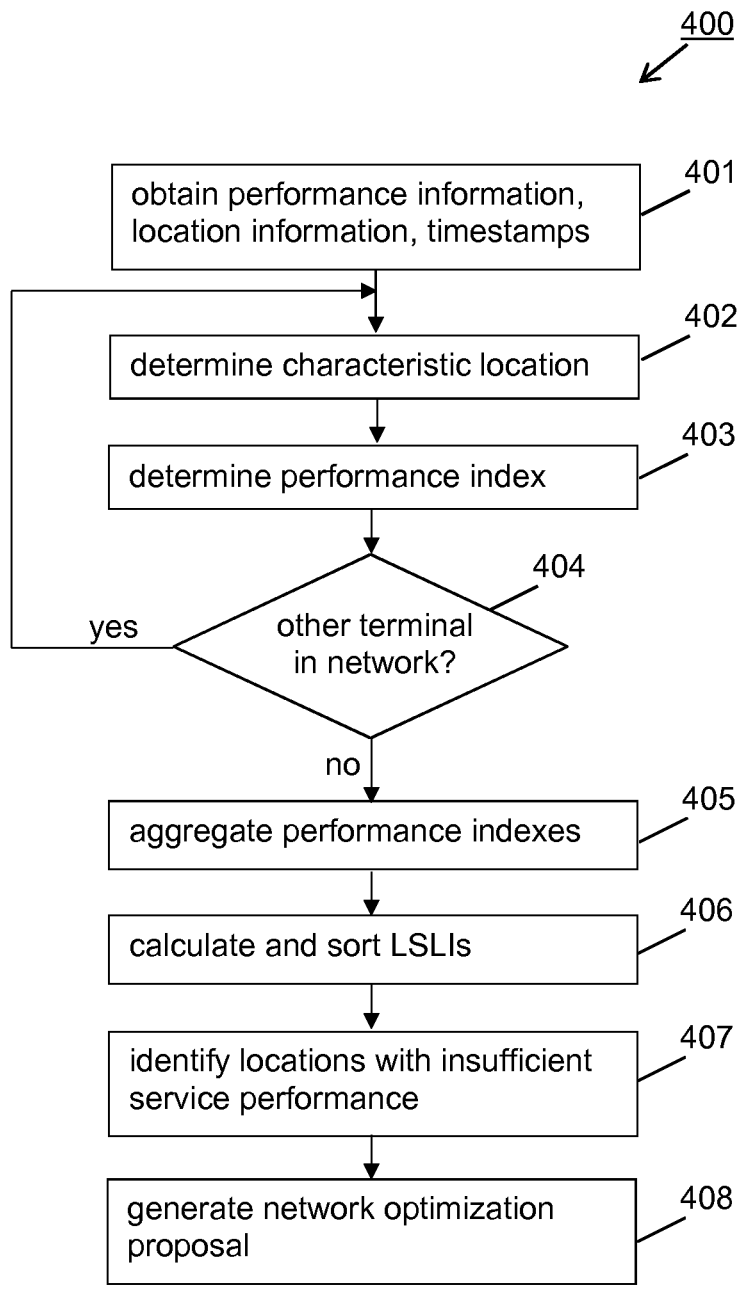
FIG. 4 is a flow diagram schematically illustrating an embodiment of a method.

FIG. 4 is a flow diagram 400 schematically illustrating a method embodiment of the technique presented herein. It will be appreciated that the method may be practiced on the basis of the system architecture illustrated in FIG. 1 and the network environment shown in FIG. 2, optionally using the table of FIG. 3 or a similar table.

In a first step 401, performance information, associated location information and associated timestamps are obtained. Thereafter, in step 402, for a given mobile user terminal within the network a characteristic location is determined based on at least parts of the performance information, the location information and the associated timestamps. Therein, characteristic location determination may for instance be performed as explained above with respect to FIG. 1, FIG. 2 and FIG. 3.

Once the characteristic location determination of step 402 has been finalized, a performance index is determined in step 403 for the thus obtained characteristic location based on performance information associated with the characteristic location and performance information associated with other locations visited by the user terminal according to the location information. A plurality of performance indices may be determined, each performance index relating to a different service attribute of the considered communication service provided in the network. Performance index determination may for instance be performed as explained above with respect to FIG. 1, FIG. 2 and FIG. 3.

In step 404, it is checked if there are other user terminals that have subscribed to the network but for which so far a characteristic location and a performance index have not yet been determined. If so, steps 402 and 403 are once again performed—however for another of the user terminals within the network than the terminal(s) considered previously. If it is however determined in step 404 that a characteristic location and a performance index have been determined for each of the user terminals within the network, it is proceeded to step 405.

In step 405, the previously determined performance indexes are aggregated by location (and by service attributes to which they relate if more than one service attribute has been considered in step 403). Moreover, LSLIs are calculated and sorted in step 406. Therein, performance index aggregation, LSLI calculation and sorting may for instance be performed as explained above with respect to FIG. 1, FIG. 2 and FIG. 3. Based on the sorted LSLIs, a location or several locations where communication service performance is considered insufficient are identified in step 407. Finally, in step 408 a network optimization proposal is generated, the network optimization proposal aiming at improving service performance at the identified location/locations.

Figure 5:
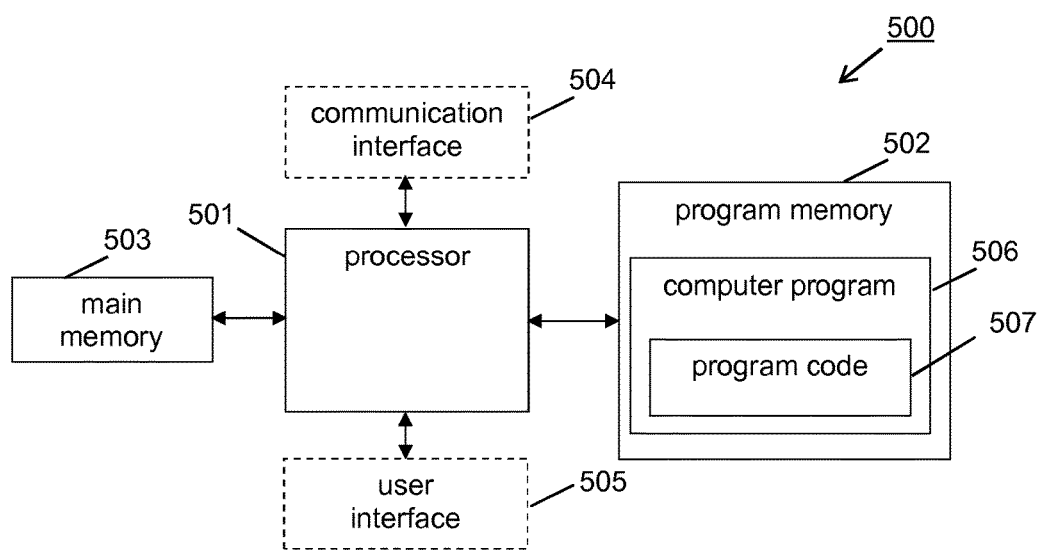
FIG. 5 schematically illustrates an apparatus embodiment.

FIG. 5 schematically illustrates an apparatus embodiment. The apparatus 500 may for instance be or form a part of (e.g., as a module such as a chip or a chipset) of another apparatus, such as a server. As another example, apparatus 500 may form part of data analytics module 140 of FIG. 2 or of an apparatus jointly implementing data analytics module 140 and aggregator module 150 (which may, however, also be embodied as a server or several servers).

Apparatus 500 comprises a processor 501. Processor 501 may represent a single processor or two or more processors, which are for instance at least partially coupled, for instance via a bus. Processor 501 interfaces with a program memory 502 and a main memory 503. Some or all of memories 502 and 503 may also be included into processor 501. One of or both of memories 502 and 503 may be fixedly connected to processor 501 or at least partially removable from processor 501, for instance in the form of a memory card or stick. Program memory 502 may for instance be a non-volatile memory. Examples of such tangible, non-volatile storage media include a FLASH memory, any of a ROM, PROM, EPROM and EEPROM memory or a hard disc, to name but a few examples. Program memory 502 may also comprise an operating system for processor 501. Main memory 503 may for instance be a volatile memory. It may for instance be a RAM or DRAM memory, to give but a few non-limiting examples. It may for instance be used as a working memory for processor 501 when executing an operating system and/or programs.

Optionally, apparatus 500 may further comprise a communication interface 504 (or several communication interfaces) controlled by processor 501 and configured to receive and transmit signals. By means of communication interface 504, apparatus 500 may for instance receive at least one of performance information, location information and timestamps. Communication interface 504 may for instance comprise circuitry such as modulators, filters, mixers, switches and/or one or more antennas to allow transmission and/or reception of signals. Communication interface 504 may for instance be an interface for wireless communication or for wire-bound communication.

Optionally, apparatus 500 may further comprise a user interface 505 configured to present information to a user of apparatus 500 and/or to receive information from such a user. For instance, a network operator employee may control the functionality of apparatus 500 by means of user interface 505. User interface 505 may for instance comprise a keyboard for user input and/or a display.

In program memory 502, a computer program 506 comprising computer program code 507 is stored. When executed by processor 501, computer program code 507 causes apparatus 500 to perform an embodiment of a method according to the first aspect of the present disclosure (e.g., as exemplified in FIG. 4). Program memory 502 is thus an embodiment of a tangible, non-transitory, non-volatile computer readable storage medium according to the third aspect of the present disclosure. When program code 507 is executed by processor 501, apparatus 500 then inter alia determines a performance index related to a performance of a communication service provided in a network the communication service being usable by a mobile user terminal. To this end, apparatus 500 compares performance information associated with a characteristic location of the user terminal and performance information associated with at least one other location visited by the user terminal. The performance index is indicative of a relative performance of the communication service at the characteristic location of the user terminal compared to the at least one other location visited by the user terminal.

A characteristic location of the user terminal is likely also a characteristic location of the user of said user terminal. When a location of the user terminal is a characteristic location, e.g., a characteristic stationary location, the performance of a communication service usable by the user terminal may be of particular importance in comparison to the service performance at other user terminal locations. For a particular user's (also called subscriber's) overall service performance perception, service performance at a characteristic location may be of high relevance. Specifically, users are likely to have a negative overall service performance perception if service performance at a characteristic location falls short of that at other user terminal locations.

Determining a communication service performance index by comparing performance information associated with a characteristic location of the user terminal and performance information associated with at least one other location visited by the user terminal may give information on the relative performance at the characteristic location. Thus, it may be noticed if service performance at a characteristic location falls short of that at other user terminal locations. Accordingly, a basis for targeted network optimization aiming at improving service performance at the characteristic location is provided.

The above described embodiments join the benefits of long term user terminal profiling and those of communication service performance analysis. Thus, identification of cases when a user terminal's experienced performance (and thus perceived performance of the user to whom it belongs) is significantly worse at certain characteristic locations, e.g., often visited locations such as the user's home, than at other locations. Based on this analysis result, the mobile network operator can take the right path of action. For instance, a preventive network improvement step might reduce customer churn which has paramount importance in today's economic situation.

The present invention has been described with reference to exemplary embodiments. It will be apparent to one skilled in the art that the present invention can be implemented in various other embodiments. The present invention is thus only limited by the scope of the claims that follow.

The invention claimed is:

1. A method of determining a performance index related to a performance of a communication service provided in a network, the method comprising:
   determining, on an individual user terminal basis, a performance index specific to a user terminal using the communication service by comparing performance information associated with a characteristic location of the user terminal and performance information associated with at least one other location visited by the user terminal; and
   wherein the performance index is indicative of a relative performance of the communication service at the characteristic location of the user terminal compared to the at least one other location visited by the user terminal;
   wherein the performance information is subscriber-level performance information derived from subscriber-level performance statistics; and
   wherein the characteristic location is a location determined by at least one of:
      a longer time interval spent by the user terminal at the characteristic location than at the at least one other location;
      a higher visiting rate at the characteristic location than at the at least one other location; and
      a more intensive usage of the communication service at the characteristic location than at the at least one other location.

2. The method of claim 1, wherein the performance index is indicative of the performance of the communication service as perceived by a user of the user terminal at the characteristic location.

3. The method of claim 1, wherein the characteristic location is a location determined by a longer time interval spent by the user terminal at the characteristic location than at the at least one other location.

4. The method of claim 1, further comprising determining the characteristic location.

5. The method of claim 4, wherein the characteristic location is determined based on location information indicative of locations of the user terminal within the network.

6. The method of claim 5, wherein the performance information is associated with the location information.

7. The method of claim 4, wherein determining the characteristic location is based on at least one of:
   residence information associated with the location information, the residence information being indicative of a time interval spent at a location indicated by the location information;
   visiting information associated with the location information, the visiting information being indicative of a visiting pattern of the location indicated by the location information; and
   service usage information associated with the location information, the service usage information being indicative of a service usage at the location indicated by the location information.

8. The method of claim 7:
   wherein performance information is obtained at equally spaced points in time with a constant time interval there between;
   wherein the performance information comprises performance data for several of the points in time, the performance data being associated with a common location indicated by the location information; and
   wherein the residence information is obtained based on the performance data and the location information.

9. The method of claim 7, wherein determining the characteristic location comprises calculating a characteristic location indicator based on at least one of a value derived from the residence information, a value derived from the visiting information, and a value derived from the service usage information.

10. The method of claim 9, wherein calculating the characteristic location indicator comprises calculating a weighted combination of at least two of a value derived from the residence information, a value derived from the visiting information, and a value derived from the service usage information.

11. The method of claim 9:
wherein determining the characteristic location comprises comparing the characteristic location indicator to a threshold; and
wherein a location indicated by the location information qualifies as a characteristic location if the characteristic location indicator is greater than the threshold.

12. The method of claim 11:
wherein a first characteristic location indicator is calculated for a first time scale; and
wherein a second characteristic location indicator is calculated for a second time scale.

13. The method of claim 12:
wherein determining the characteristic location comprises comparing the first characteristic location indicator to a first threshold and comparing the second characteristic location indicator to a second threshold;
wherein a location indicated by the location information qualifies as a characteristic location if the first characteristic location indicator is greater than the first threshold and the second characteristic location indicator is greater than the second threshold.

14. The method of claim 1, further comprising assigning a value to the performance index based on a first performance value derived from the performance information associated with the characteristic location and a second performance value derived from the performance information associated with the at least one other location.

15. The method of claim 14, wherein at least one of:
the first performance value is derived by averaging values of a service attribute of the communication service for different points in time, the values of the service attribute forming part of the performance information associated with the characteristic location; and
the second performance value is derived by averaging values of a service attribute of the communication service for different points in time, the values of the service attribute forming part of the performance information associated with the at least one other location.

16. The method of claim 14, wherein the value assigned to the performance index is:
a first value if the first performance value is below a difference calculated by subtracting a threshold from the second performance value;
a second value if the first performance value is greater than or equal to the difference calculated by subtracting the threshold from the second performance value and smaller than a sum of the second performance value and the threshold; and
a third value if the first performance value is greater than the sum of the second performance value and the threshold.

17. The method of claim 14, wherein a difference between the first performance value and the second performance value is assigned to the performance index.

18. The method of claim 1:
wherein a plurality of characteristic locations is determined for a plurality of user terminals; and
wherein, for each of the plurality of characteristic locations and for each user terminal having that respective characteristic location, performance indexes related to the same service attribute of the communication service are determined.

19. The method of claim 1, wherein the method further comprises generating a network optimization proposal specific to the user terminal based on the performance index.

20. The method of claim 1, wherein the subscriber performance index indicates an approach specific to the user terminal for improving the performance of the communication service as perceived by a user of the user terminal at the characteristic location for the user.

21. A non-transitory computer readable recording medium storing a computer program product for determining a performance index related to a performance of a communication service provided in a network, the computer program product comprising software instructions which, when run on processing circuitry, causes the processing circuitry to:
determine, on an individual user terminal basis, a performance index specific to a user terminal using the communication service by comparing performance information associated with a characteristic location of the user terminal and performance information associated with at least one other location visited by the user terminal; and
wherein the performance index is indicative of a relative performance of the communication service at the characteristic location of the user terminal compared to the at least one other location visited by the user terminal;
wherein the performance information is subscriber-level performance information derived from subscriber-level performance statistics; and
wherein the characteristic location is a location determined by at least one of:
a longer time interval spent by the user terminal at the characteristic location than at the at least one other location;
a higher visiting rate at the characteristic location than at the at least one other location; and
a more intensive usage of the communication service at the characteristic location than at the at least one other location.

22. An apparatus for determining a performance index related to a performance of a communication service provided in a network, the communication service being usable by a mobile user terminal, the apparatus comprising:
processing circuitry; and
memory containing instructions executable by the processing circuitry whereby the processing circuitry is operable to:
determine, on an individual user terminal basis, a performance index specific to a user terminal using the communication service by comparing performance information associated with a characteristic location of the user terminal and performance information associated with at least one other location visited by the user terminal; and
wherein the performance index is indicative of a relative performance of the communication service at the characteristic location of the user terminal compared to the at least one other location visited by the user terminal;
wherein the performance information is subscriber-level performance information derived from subscriber-level performance statistics; and
wherein the characteristic location is a location determined by at least one of:
a longer time interval spent by the user terminal at the characteristic location than at the at least one other location;

a higher visiting rate at the characteristic location than at the at least one other location; and a more intensive usage of the communication service at the characteristic location than at the at least one other location.

* * * * *